United States Patent [19]
Nishida et al.

[11] Patent Number: 5,203,862
[45] Date of Patent: Apr. 20, 1993

[54] AUTOMATIC TRANSMISSION WITH HYDRAULIC OPERATOR HAVING NESTED DRUMS

[75] Inventors: Masaaki Nishida; Chihiro Hosono; Yoichi Hayakawa, all of Aichi, Japan

[73] Assignee: Aisin Aw Co., Ltd., Japan

[21] Appl. No.: 752,535

[22] PCT Filed: Nov. 15, 1990

[86] PCT No.: PCT/JP90/01481
§ 371 Date: Sep. 6, 1991
§ 102(e) Date: Sep. 6, 1991

[87] PCT Pub. No.: WO91/07609
PCT Pub. Date: May 30, 1991

[30] Foreign Application Priority Data
Nov. 15, 1989 [JP] Japan ................... 1-297168

[51] Int. Cl.⁵ ........................... F16H 3/66
[52] U.S. Cl. ..................... 475/282; 475/283
[58] Field of Search .......... 475/59, 269, 271, 282, 475/283, 311, 312, 313, 317, 318, 319, 341, 346, 903

[56] References Cited

U.S. PATENT DOCUMENTS

| | | | |
|---|---|---|---|
| 3,053,115 | 9/1962 | Cartwright et al. | 475/159 |
| 3,053,116 | 9/1962 | Christenson et al. | 74/869 |
| 3,757,607 | 9/1973 | Malloy | 475/283 |
| 5,006,102 | 4/1991 | Takare et al. | 475/282 |

FOREIGN PATENT DOCUMENTS

| | | | |
|---|---|---|---|
| 2127827 | 2/1972 | Fed. Rep. of Germany | 475/282 |
| 62-141344 | 6/1987 | Japan | |
| 63-61538 | 11/1988 | Japan | |
| 163568 | 6/1990 | Japan | 475/283 |

Primary Examiner—Richard M. Lorence
Assistant Examiner—Khoi Q. Ta
Attorney, Agent, or Firm—Lorusso & Loud

[57] ABSTRACT

A compact clutch device in an automatic transmission, wherein an input shaft (15) is provided thereon with a first drum (111) rotatably and axially slidably connected to the input shaft (15) through the inner peripheral portion of a rotatably supporting portion (112). A second drum (117) has, at its inner peripheral portion of, a rotatably supporting portion (120) of which is relatively rotatably coupled onto the outer peripheral portion of the rotatably supporting portion (112) of the first drum (111). The inner side of an outer cylinder of the first drum (111) and a hub portion (119) provided on the radial surface of the second drum (117) are engageably interconnected through a first clutch (C1). The inner side of an outer cylinder of the second drum (117) and a rotatable element (R2) of a planetary gear unit (12) are engagebly interconnected through a second clutch (C0), and the second drum (117) is also selectively connected to another rotatable element (R1) of the planetary gear unit (12) through a clutch.

3 Claims, 7 Drawing Sheets

| | | SOLENOID | | | CLUTCH | | | | BRAKE | | O.W.C. | | GEAR RATIO |
|---|---|---|---|---|---|---|---|---|---|---|---|---|---|
| | | NO.1 | NO.2 | NO.3 | C0 | C1 | C2 | C3 | B1 | B2 | F0 | F1 | |
| P | | ○ | × | × | × | × | × | × | × | × | × | × | |
| R | V≤7 | ○ | × | × | × | × | ○ | × | × | ○ | × | × | 2.769 |
| | V>7 | × | ○ | × | × | × | ○ | × | × | × | × | × | |
| N | | ○ | × | × | × | × | × | × | × | × | × | × | |
| D | 1ST | ○ | × | × | × | ○ | × | × | × | × | ○ | ○ | 2.807 |
| | 2ND | ○ | ○ | × | × | ○ | × | × | ○ | × | ○ | × | 1.479 |
| | 3RD | × | ○ | ◉ | ○ | ○ | × | ○ | ◉ | × | ○ | × | 1.000 |
| | 4TH | × | × | ◉ | ○ | ○ | × | × | ○ | × | × | × | 0.735 |
| 2 | 1ST | ○ | × | × | × | ○ | × | ○ | × | × | ○ | ○ | |
| | 2ND | ○ | ○ | × | × | ○ | × | ○ | ○ | × | ○ | × | |
| | 3RD | × | ○ | × | ○ | ○ | × | ○ | ◉ | × | ○ | × | |
| | (3RD) | × | × | × | ○ | ○ | × | ○ | ◉ | × | ○ | × | |
| 1 | 1ST | ○ | × | × | × | ○ | × | ○ | × | ○ | ○ | ○ | |
| | 2ND | ○ | ○ | × | × | ○ | × | ○ | ○ | × | ○ | × | |
| | (2ND) | × | ○ | × | × | ○ | × | ○ | ○ | × | ○ | × | |
| | (1ST) | × | × | × | × | ○ | × | ○ | × | ○ | ○ | ○ | |

| REMARKS | ○ | ON | ENGAGE |
|---|---|---|---|
| | × | OFF | RELEASE |
| | ◉ | ON: L-up ON / OFF: L-up OFF | B1 RELEASED ON RELEASE PRESSURE |

Fig.6
(PRIOR ART)

AUTOMATIC TRANSMISSION WITH HYDRAULIC OPERATOR HAVING NESTED DRUMS

TECHNOLOGICAL FIELD

The present invention relates to a compact clutch system for an automatic transmission.

TECHNOLOGICAL BACKGROUND

Generally speaking, automatic transmission of the so-called "Simpson type" has two single planetary gear units which share sun gears and in which the carrier of the first planetary gear unit and the ring gear of the second planetary gear unit are integrally connected to each other. Thus, the forward 3rd speed is established by selectively inputting to the ring gear or sun gear of the first planetary gear unit through a clutch, by stopping certain rotary components of the planetary gear units by brakes or one-way clutches, and by outputting from the ring gear of the second planetary gear unit connected integrally to the carrier of the first planetary gear unit.

A four-speed prior art automatic transmission is based upon the aforementioned three-speed automatic transmission mechanism composed of the two planetary gear units and establishes a forward 4th gear stage by addition of an over-drive (O/D) mechanism or an underdrive (U/D) mechanism composed of a single planetary gear unit.

In the automatic transmission having the O/D mechanism, moreover, the output member, i.e., the ring gear of this O/D mechanism, is axially connected to the input member of the three-speed automatic transmission mechanism.

Figure 6:
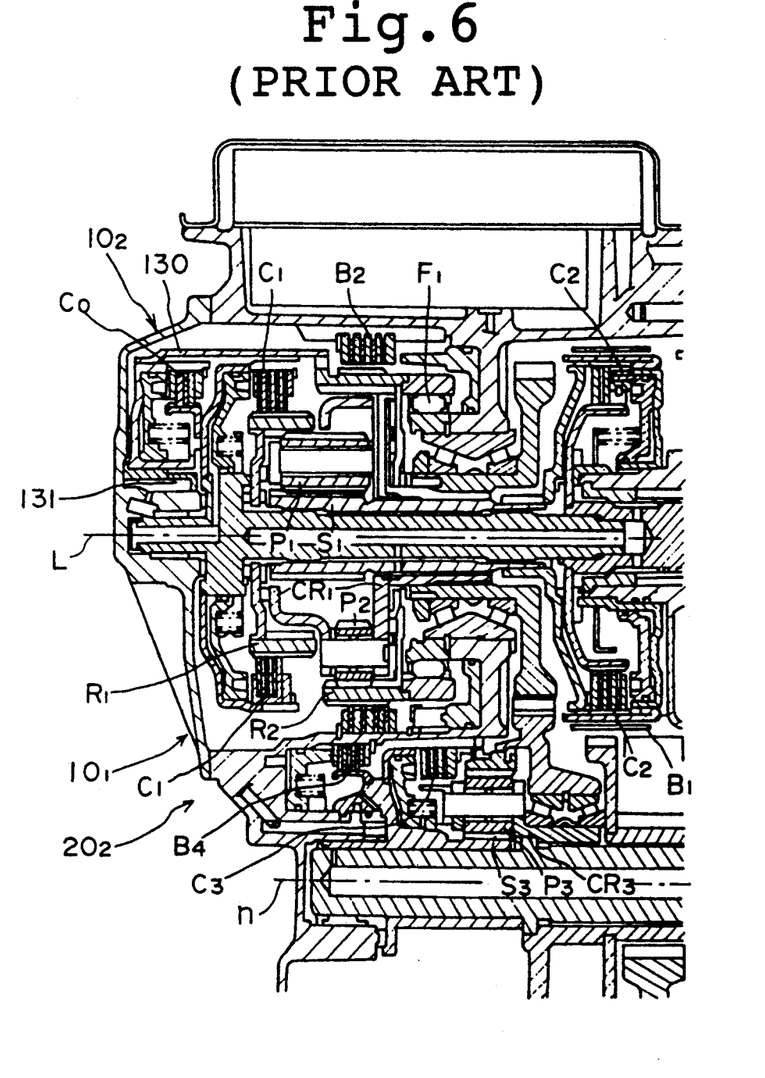
FIG. 6 is a section showing the four-speed automatic transmission of the prior art.

In the automatic transmission shown in FIG. 6, for example, an O/D mechanism is attached to a three-speed automatic transmission mechanism $10_1$ (as shown at a lower half with respect to line L of FIG. 6) to provide a four-speed automatic transmission mechanism (as shown at an upper half from the line L of FIG. 6). This example is equipped with an O/D mechanism clutch C0, through which rotation of the input shaft is transmitted to the ring gear R2 of the dual planetary gear units.

In view of recent trends toward the FF type automobile and a higher output power, the automatic transmission is desired to have a smaller size and a larger capacity of transmission torque. However, these objectives cannot be satisfied by the aforementioned four-speed automatic transmission which is composed of the three planetary gear, including an O/D mechanism or the like, as has been described in connection with the prior art.

Specifically, in the example shown in FIG. 6, the O/D mechanism (i.e., including the clutch C0) is attached to the input shaft of the three-speed transmission mechanism so that the axial size of the automatic transmission is increased. Since, moreover, the ring gear R2 or the input member of the O/D mechanism is connected by an extension radially outward of the clutch C1, the radial size of the automatic transmission is also increased.

According to the simplest structure, moreover, the r.p.m. sensor of the input shaft is attached to the transmission casing 17a to measure the r.p.m. of the drum 130 of the clutch C0. With this structure, however, the r.p.m. of the input shaft cannot be measured from the clutch C0 drum 130 which is not rotated at all times.

DISCLOSURE OF THE INVENTION

An object of the present invention is to provide a clutch system for an automatic transmission, which can achieve the four-speed transmission mechanism without any increase in the axial and radial sizes, as compared with the three-speed transmission mechanism.

Another object of the present invention is to provide a clutch system for a four-speed automatic transmission mechanism which allows attachment of an input r.p.m. sensor without any difficulty.

In order to achieve the above-specified objects, according to the present invention, there is provided a clutch system for an automatic transmission comprising an automatic transmission mechanism including: a planetary gear unit 12; an input shaft 15 connected to a plurality of rotary components of said gear unit 12 through individual clutches; an output member connected to a predetermined one of the rotary components of said gear unit; and stop means for stopping a predetermined one of the rotary components of said gear unit 12, which system comprises: a first drum 111 axially slidably mounted on said input shaft 15 through rotatably supporting portion 112 and is secured against rotation relative to shaft 15; and a second drum 117 having its rotatably supported by supporting portion 120 having its inner surface in contact with the outer circumference of the rotatably supporting portion 112 of said first drum 111, wherein the inner surface of the outer flange portion of said first drum 111 and a hub portion 119 formed on the radial flange portion of said second drum 117 are freely engaged with or released from each other through a first clutch C1, wherein said second drum 117 has its outer flange portion its inner surface freely engaged with or released from one rotary element R2 of the planetary gear unit 12 through a second clutch C0, and wherein said second drum 117 is freely engaged with or released from another rotary element R1 of said planetary gear unit 12.

According to the present invention, the clutch system comprises: a first drum 111 mounted against rotation and axially slidable on input shaft 15 through a rotatably supporting portion 112; and a second drum 117 having its rotatably supporting portion 120 having its inner surface rotatably mounted on the outer circumference of the rotatably supporting portion of the first drum 111, wherein the inner surface of the outer cylindrical portion of the first drum 111 and a hub portion 119 formed on the radial flange portion of the second drum 117 are freely engaged with or released from each other through a first clutch C1, and wherein the inner surface of the outer cylindrical portion of the second drum 117 and the ring gear R2 of the planetary gear unit are freely engaged with or released from each other through the second clutch C0. As a result, the rotation of the input shaft of the automatic transmission is transmitted to the ring gear R2 of the planetary gear unit by the engagements of the first clutch C1 and the second clutch C0 so that the target gear stage, e.g., the 4th speed gear stage is achieved through the planetary gear unit.

As a result, the second drum 117 encircling the second clutch C0 for establishing the 4th speed is supported on the supporting portion 112 of the first drum 111 so that the axial size of the clutch system of the present invention can be accordingly reduced. Specifically, the rotatably supporting portion (or axially supporting portion) 120 of the second drum 117 is positioned radially outward of the rotatably supporting portion (or splined portion) 112 of the first drum 111 so that the axial distance can be shortened by the length of the rotatably supporting portion 120 of the drum 117 (i.e., the length corresponding to the bearing 131 of the C0 drum 130, as shown in FIG. 6).

Moreover, the second drum 117 can be engaged with the ring gear R2 of the planetary gear unit without an axial extension radially outward of the external diameter of the first drum 111 so that the radial size is not increased.

Since, furthermore, the second drum 117 is arranged between the torque converter 50 and the first drum 111, drum 111 can be located near the outer casing 17 of the transmission so that the sensor for detecting the r.p.m. of the input shaft can be attached in the vicinity of the first drum 111.

BRIEF DESCRIPTION OF THE DRAWINGS

FIGS. 4-a and 4-b are circuit diagrams showing the whole structure of a hydraulic control system.

BEST MODE FOR CARRYING OUT THE INVENTION

The present invention will be described in detail in the following in connection with the embodiment thereof with reference to the accompanying drawings.

Figure 2:
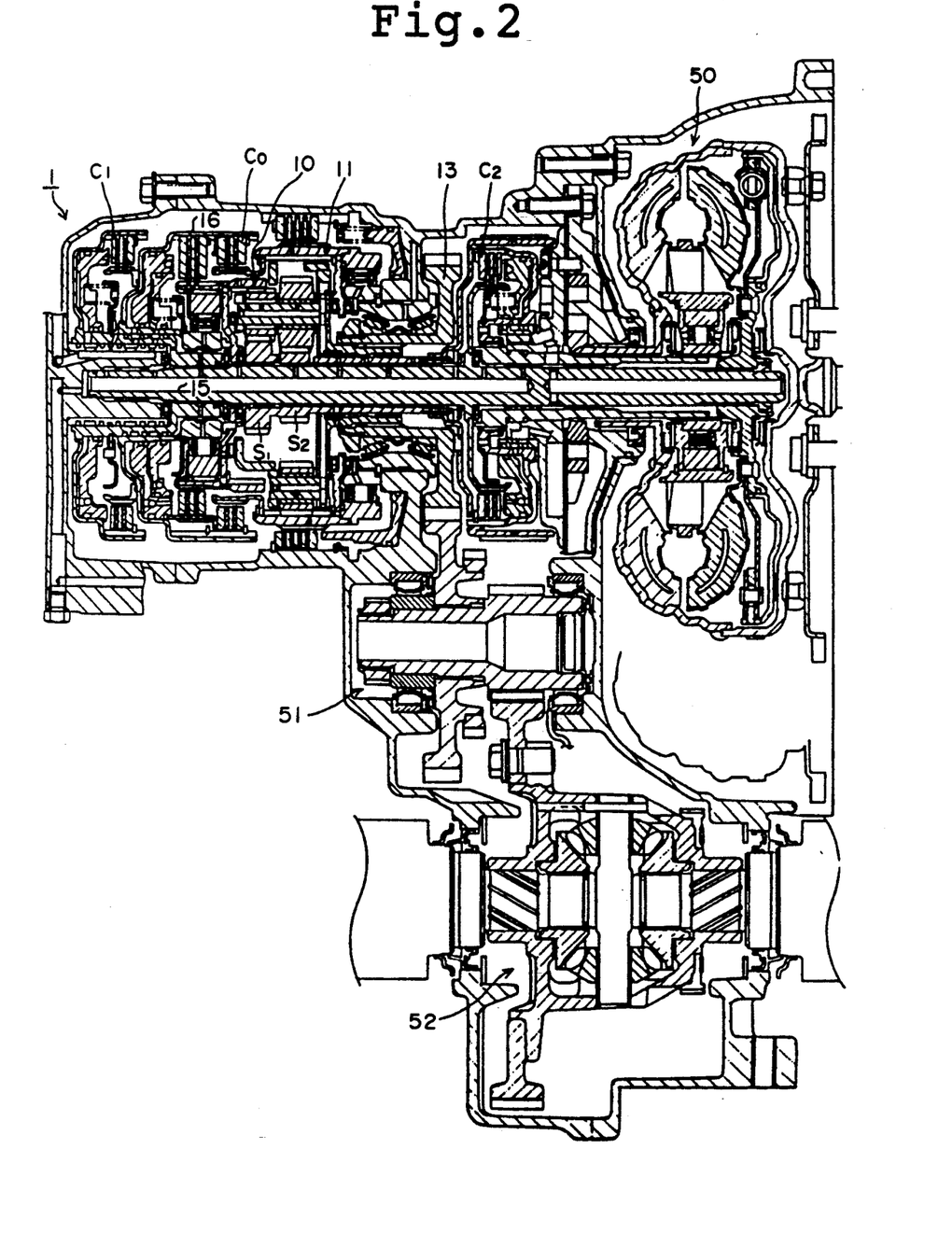
FIG. 2 is a section of an automatic transmission to which the present invention is applied.
Figure 3:
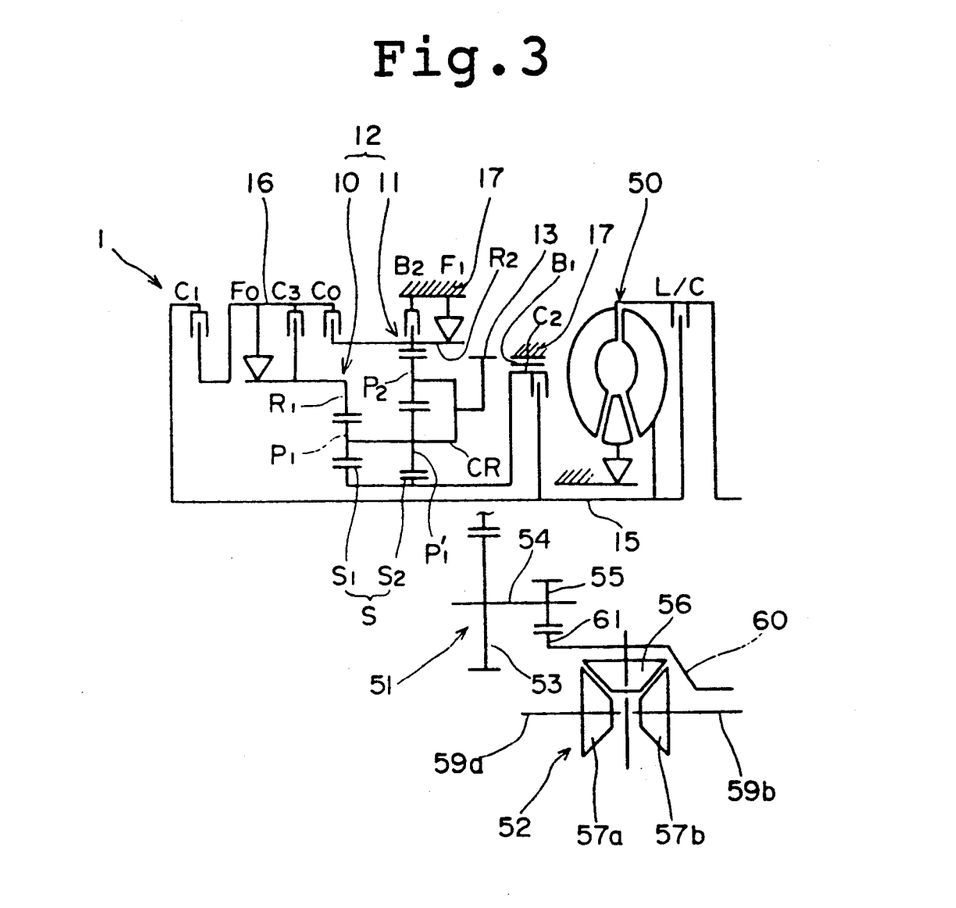
FIG. 3 is a schematic diagram showing the automatic transmission of FIG. 2.

FIG. 3 is a schematic diagram showing the automatic transmission, and FIG. 2 is a section showing the automatic transmission to which the present invention is applied.

A four-speed automatic transmission according to the present invention is constructed of a torque converter 50 having a lockup clutch L/C, a four-speed shift gear mechanism 1, a reduction mechanism 51 and a differential mechanism 52.

The four-speed shift gear mechanism 1 is equipped with a planetary gear unit 12 which is a combination of a single planetary gear 10 and a dual planetary gear 11. This gear unit 12 has its sun gears S1 and S2 integrated into a sun gear S. Moreover, pinions P1 and P1' meshing with the sun gears S1 and S2 share a carrier CR. This carrier CR is shared with that CR supporting said pinions and a pinion P2 meshing with a ring gear (referred hereinafter to as the "large ring gear") R2 of the dual planetary gear 11.

Moreover, an input shaft 15 extending from the output member of the torque converter 50 is connected through a first clutch C1 to a connecting member 16 and through a second clutch C2 to the sun gear S. Between the connecting member 16 and the ring gear (referred to hereinafter as the "small ring gear") R1 of the single planetary gear 10, there are interposed the third clutch C3 and a second one-way clutch F0. A fourth clutch C0 is interposed between the connecting member 16 and the large ring gear R2.

On the other hand, the aforementioned sun gear S can be stopped by a first brake B1 which is a band brake. Between the large ring gear R2 and a casing 17, there are interposed a second brake B2 and a first one-way clutch F1. Moreover, the carrier CR is connected to an output gear 13 which is positioned generally at the center of the shift gear mechanism 1.

The reduction mechanism 51 is equipped with a counter shaft 54 which is rotatably supported by the casing 17. On the counter shaft 54, there are fixed a large gear 53 meshing with the aforementioned output gear 13 at all times, and a small gear 55.

The differential mechanism 52 is composed of a differential pinion 56 and lefthand and righthand pinions 57a and 57b meshing with each other. These pinions 57a and 57b are fixed on lefthand and righthand front axles 59a and 59b, respectively. The differential pinion 56 is supported by a differential carrier 60 which in turn is rotatably supported by the casing 17. On the differential carrier 60, there is fixed a ring gear 61 which meshes with the aforementioned small gear 55 at all times.

Figure 4A:
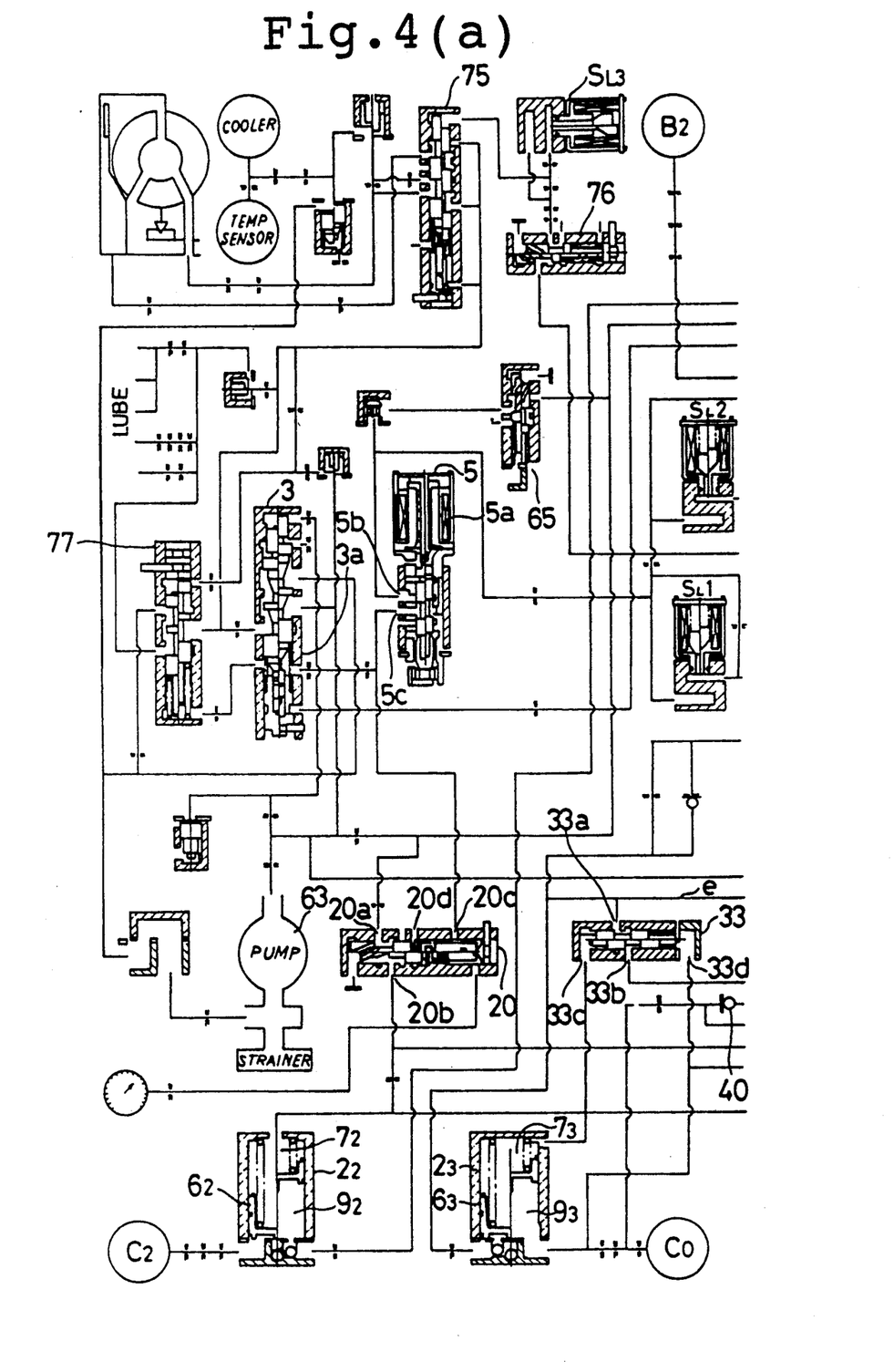
Figure 4B:
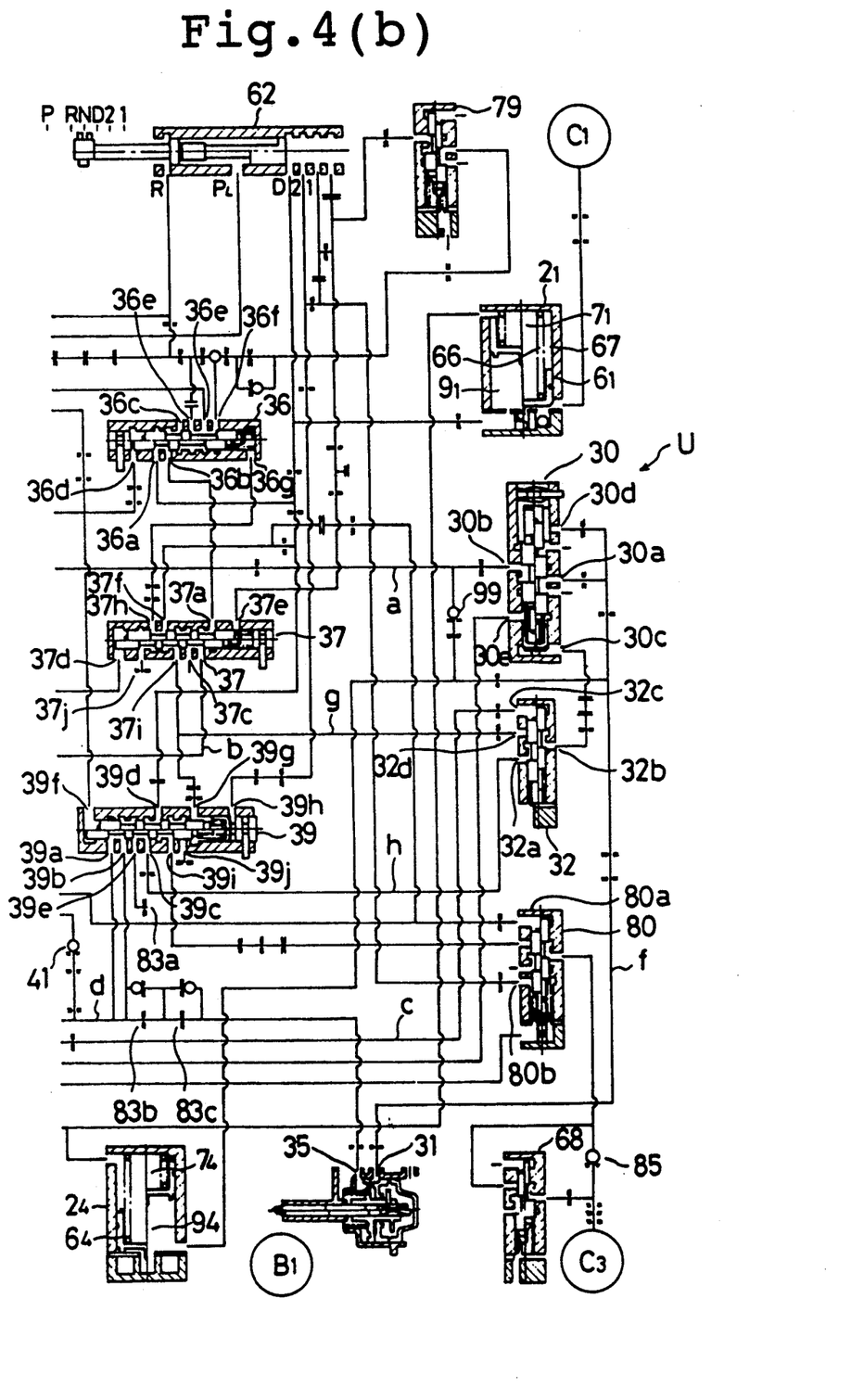

FIGS. 4-a and 4-b are diagrams showing the hydraulic control system of the automatic transmission of the present invention. In these Figures, a hydraulic control system U is equipped with hydraulic servos $C_1$, $C_2$, $C_3$ and $C_0$, and $B_1$ and $B_2$ for actuating the clutches C1, C2, C3 and C0 and the brakes B1 and B2, respectively. Of these, the first clutch hydraulic servo $C_1$, the second clutch hydraulic servo $C_2$, the fourth clutch hydraulic servo $C_0$, and the first brake hydraulic servo $B_1$ are respectively arranged with accumulators $2_1$, $2_2$, $2_3$ and $2_4$ in parallel therewith.

Numeral 62 designates a manual valve which has its oil passages switched by the shifting operations of the driver to individual ranges. The manual valve 62 has: its D port communicating with a line pressure passage PL in the D range; its D and 2nd ports in the 2nd range; its D, 2nd and 1st ports in the 1st range; and its R port in the R range.

Numeral 3 designates a primary regulator valve which is actuated by a throttle pressure or the oil pressure coming from the R range port to regulate the oil pressure coming from a pump 63, to generate the line pressure. Numeral 5 designates a throttle pressure control valve which is controlled by an electric signal based upon the throttle opening to generate a predetermined throttle pressure (Pth).

Said throttle pressure control valve 5 is equipped with a solenoid 5a, which is controlled by the electric signal coming from a not-shown control unit, and an input port 5b and an output port 5c. The throttle pressure Pth coming from the output port 5c is fed to a throttle pressure port 3a of the primary regulator valve 3 and to a feedback port 20c of an accumulator control valve 20.

65 Designates a solenoid modulator valve for modulating the line pressure, to the input port 5b of the throttle pressure control valve 5. The accumulator control valve 20 is equipped with not only an input port 20a but also a control port 20b and the feedback port 20c. The oil pressure at the control port 20b is fed to the back pressure chambers $7_1$ to $7_4$ of the aforementioned accumulators $2_1$ to $2_4$.

Moreover, these accumulators $2_1$ to $2_4$ are equipped with pistons $6_1$ to $6_4$ which have their front faces defining accumulator chambers $9_1$ to $9_4$ communicating with the individual hydraulic servos and have their back faces defining the back pressure chambers $7_1$ to $7_4$ having pressure receiving areas equal to those of the accumulator chambers. At the front faces of said pistons $6_1$ to $6_4$, there are disposed a shorter spring 66 and a longer spring 67, as exemplified in the accumulator $2_1$.

Moreover, all of these accumulators are made to have an identical shape and to share common parts.

The third clutch hydraulic servo $C_3$ is equipped with a modulator valve 68, but the second brake hydraulic servo $B_2$ is fed either directly with the line pressure or indirectly with the modulator pressure through the modulator valve. Thus, both of these hydraulic servos $C_3$ and $B_2$ not equipped with an accumulator.

There are also provided a 1–2 shift valve 36, a 2–3 shift valve 37 and 3–4 shift valve 39, of which: the 1–2 shift valve 36 and the 3–4 shift valve 39 are controlled by a second solenoid valve $S_L2$; and the 2–3 shift valve 37 is controlled by a first solenoid valve $S_L1$.

Specifically, the 1–2 shift valve 36 is formed with: a control oil chamber 36d exposed to the control oil pressure coming from the solenoid valve $S_L2$; a line pressure supply port 36a communicating the with D range port; an output port 36b; a drain port 36c; a $B_2$ port 36e; a low modulator port 36f; and a constraining control oil chamber 36g. The 1–2 shift valve 36a is held in its lower half position at the 2nd, 3rd and 4th speeds and is switched to its upper half position at the 1st speed. On the other hand, the 2–3 shift valve 37 is formed with: a control oil chamber 37d exposed to the control oil pressure coming from the solenoid valve $S_L1$; an input port communicating with an oil line a leading from the output port of the aforementioned 1–2 shift valve 36; an output port 37b communicating with the fourth clutch hydraulic servo $C_0$ via an oil line b; a drain port 37c; a 1st range constraining control oil chamber 37e; a D range line pressure supply port 37f; a port 37h communicating with the constraining control oil chamber 36g of the aforementioned 1–2 shift valve 36; a port 37i; and a drain port 37j. The 2–3 shift valve is held in its lower half position at the 1st and 2nd speeds and is switched to its upper half position at the 3rd and 4th speeds.

On the other hand, the 3–4 shift valve 39 is formed with: a control oil chamber 39f exposed to the control oil pressure coming from the solenoid valve $S_L2$; a $C_0$ port 39a; a $B_1$ release port 39b; a drain port 39e; a constraining control oil chamber 39g communicating with the aforementioned port 37i; a 2nd range constraining control oil chamber 39h; a $C_3$ port 39i; and a drain port 39j. The 3–4 shift valve 39 is held in its lower half position at the 1st, 2nd and 3rd speeds and is switched to its upper half position at the 4th speed.

Numeral 30 designates a $B_1$ modulator valve, which is formed with: a line pressure supply port 30b communicating with the oil line a leading from the output port 36b of the aforementioned 1–2 shift valve 36; a pressure modulation port 30a; a feedback port 30d; a constraining control oil chamber 30c; and a control oil chamber 30e communicating with the pressure control port 20b of the accumulator control valve 20. The $B_1$ modulator valve 30 reduces the line pressure coming from the line pressure supply port 30b at a predetermined ratio and outputs it to the pressure modulation port 30a, when no constraining control oil pressure is exerted upon the control oil.

Numeral 32 designates a $B_1$ modulator control valve which is formed with: a first input port 32d communicating with an oil line g leading from the port 37i of the aforementioned 2–3 shift valve 37; a second input port 32a communicating with an oil line h leading from the port 39c of the aforementioned 3–4 shift valve 39; and an output port 32b communicating with the constraining control oil chamber 30c of the modulator valve 30. The $B_1$ modulator control valve 32 has its first input port 32d and output port 32b communicating with each other, when a control oil chamber 32c communicating with the hydraulic servo $C_0$ via an oil line c is relieved, and its second input port 32a and output port 32b communicating with each other when said control oil chamber 32c is fed with the oil pressure.

A 2–3 timing valve 33, which branches the oil line b providing the communication between the output port 37b of the 2–3 shift valve 37 and the fourth clutch hydraulic servo $C_0$, is formed with: an input port 33a communicating with the output port 37b; an output port 33b communicating with the port 39a of the 3–4 shift valve 39; a first control oil chamber 33d communicating with the hydraulic servo $C_0$; and a second control oil chamber 33c communicating with the pressure control port 20b of the accumulator control valve 20. When the oil pressure of the hydraulic servo $C_0$ rises to a predetermined level, the 2–3 timing valve 33 has its input port 33a and output port 33b communicating with each other.

In an oil line d providing the communication between the hydraulic servo $C_0$ and the port 39a, there is disposed a check value 40 for admitting the flow from the hydraulic servo $C_0$ to the port 39a. In an oil line e leading from said oil line d to the aforementioned oil line b, there is disposed a check value 41 for allowing the oil to be discharged from the port 39a to the port 37b.

Numeral 75 designates a lockup clutch control valve; numeral 76 designates a lockup clutch modulator valve; and characters $S_L3$ designates a lockup clutch controlling solenoid valve. These valves are properly controlled at the gear stages which are indicated at double circles in the operation table of FIG. 5. Moreover, numeral 77 designates a second regulator valve, and numeral 80 designates a C3 timing valve.

Next, the operations of the present embodiment will be described in the following.

Figure 5:
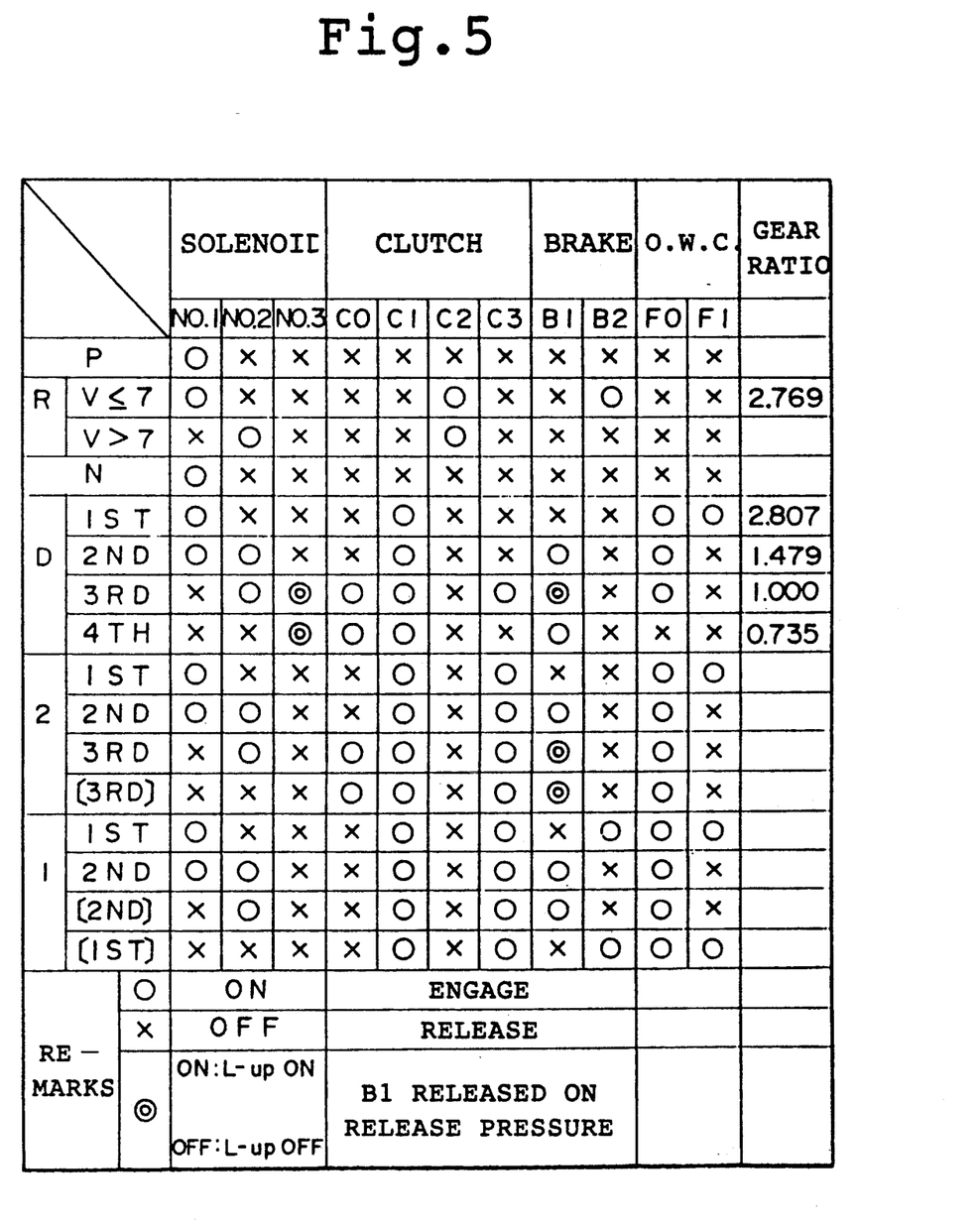
FIG. 5 is a table enumerating the operations of a shift gear mechanism.

At the 1st speed in which the manual valve 62 is shifted to the D range, as shown in FIG. 5, the first solenoid valve $S_L1$ only is ON in the drain state, but the second solenoid valve $S_L2$ is OFF in the supply state.

In this state, the 1–2 shift valve 36 has its control oil chamber 36d fed with the oil pressure and is in its upper half position, and the 2–3 shift valve 37 has its control oil chamber 37d relieved from the oil pressure and is in its lower half position. Moreover, the 3–4 shift valve 39 has its control oil chamber 39f fed with the oil pressure but is constrained in its lower half position because its constraining control oil chamber 39g is fed with the line pressure from the line pressure supply port 37f of the 2–3 shift valve 37.

As a result, the first clutch hydraulic servo $C_1$ only is fed with the line pressure from the D range port of the manual valve 62, but no other hydraulic servo is supplied with the oil pressure. At this time, the throttle pressure control valve 5 is suitably operated to generate the predetermined throttle pressure Pth on the basis of the signal coming from the control unit. Said throttle pressure Pth is applied to the signal port 20c of the accumulator control valve 20 so that the line pressure supplied to the input port 20a is reduced to a predetermined ratio by the feedback pressure, and this reduced oil pressure is fed from the output port 20b to the back pressure chambers $7_1$ to $7_4$ of the individual accumulators $2_1$ to $2_4$.

As a result, in the accumulator $2_1$ communicating with the hydraulic servo $C_1$, the oil pressure of the back pressure chamber $7_1$ is properly controlled in accordance with the engagement characteristics of the first clutch C1 by the throttle pressure control valve 5 so that said clutch C1 is smoothly engaged. Simultaneously with this, not only the line pressure from the primary regulator valve 3 but also the pressures in the back pressure chambers $7_2$ to $7_4$ of the remaining accumulators $2_2$ to $2_4$ are controlled on the basis of the controls of the throttle pressure control valve 5, but the remaining clutches C0, C2 and C3 and the brakes B1 and B2 are out of engagement and are not influenced in the least.

In the 1st speed state, moreover, in which not only said first clutch C1 but also the first and second one-way clutches F1 and F0 are engaged, the rotation of the input shaft 15 is transmitted to the smaller ring gear R1 through the first clutch C1 and the second one-way clutch F0. Since, in this state, the rotation of the larger ring gear R2 is blocked by the first one-way clutch F1, the carrier CR is drastically decelerated, while allowing the sun gear S to rotate idly, so that the decelerated rotations are extracted from the output gear 13. Moreover, the rotation of this output gear 13 is decelerated by the reduction mechanism 51 and is transmitted to the lefthand and righthand accelerator shafts 59a and 59b by the differential mechanism 52.

In the 2nd speed state, on the other hand, the second solenoid valve $S_L2$ as well as the first solenoid valve $S_L1$ is turned ON. Then, the 2-3 shift valve 37 and the 3-4 shift valve 39 are held in their lower half positions, and the 1-2 shift valve 36 is switched to its lower half position by having its control oil chamber 36d relieved from the oil pressure. In this state, the line pressure of the D range port is applied to the oil line a via the line pressure supply port 36a and the output port 36b and further to the line pressure port 30b of the $B_1$ modulator valve 30.

On the other hand, the 2-3 shift valve 37 is in the state in which the D range line pressure supply port 37f and the port 37i are communicating with each other, and the line pressure from said D range line pressure supply port 37f is applied via the port 37i and the oil line g to the first input port 32d of the $B_1$ modulator control valve 32. In the first and second speed states, said control valve 32 is in its upper half position so that the oil pressure at its input port 32d is applied via the output port 32b to the constraining control oil chamber 30c of the $B_1$ modulator valve 30.

As a result, this modulator valve 30 is held at its lefthand half position, and the line pressure at the aforementioned line pressure supply port 30b is outputted without any change to the pressure modulation port 30a until it is applied by way of an oil line f to the brake engaging oil pressure chamber 31 of the first brake hydraulic servo $B_1$. As a result, the first brake B1 has its band tightened by intensive force based upon the line pressure.

At the time of an upshift from the 1st to 2nd speeds, too, the throttle pressure control valve 5 is properly controlled like the aforementioned shift to the D range by the electric signal coming from the control unit, and the line pressure is applied to the back pressure chambers $7_1$ to $7_4$ of the accumulators $2_1$ to $2_4$ by said throttle pressure. As a result, the B1 brake hydraulic servo $B_1$ is properly adjusted in accordance with the engagement characteristics of said brake B1 by having its accumulator $2_4$ controlled to a proper back pressure so that the first brake B1 is smoothly engaged.

In the meanwhile, the accumulators $2_1$, $2_2$ and $2_3$ for the remaining clutches C1, C2 and C0 have their back pressures controlled. However, the second clutch C2 and the fourth clutch C0 are in their released states and receive no influence. In the first clutch C1, the hydraulic servo $C_1$ has its oil pressure changed with the change in the line pressure based upon the throttle pressure change. However, this clutch C1 is already in the engaged static friction state, and the engaging oil pressure is at a level far higher than the torque load of the clutch, so that the clutch C1 is not slipped.

In the 2nd speed state, moreover, in which the first brake B1 and the second one-way clutch F0 as well as the first clutch C1 are engaged, the rotation of the input shaft 15 is transmitted though the first clutch C1 and the second one-way clutch F0 to the smaller ring gear R1, and the sun gear S is stopped by the first brake B1. As a result, the rotation of said smaller ring gear R1 is extracted as the 2nd speed rotations from the carrier CR while allowing the larger ring gear R2 to rotate idly. Here in this 1st to 2nd speed shift, the first one-way clutch F1 overruns to prevent the shift shocks, which might otherwise be caused by the engagement change.

In the 3rd speed state, moreover, the second solenoid valve $S_L2$ is maintained in its ON state, and the first solenoid valve $S_L1$ is switched to its OFF state.

In this state, the 1-2 shift valve 36 and the 3-4 shift valve 39 are held in their lower half positions, and the 2-3 shift valve 37 is switched to its upper half position by having its control oil chamber 37d fed with the oil pressure. As a result, the line pressure of the oil line a, which is supplied via the 1-2 shift valve ports 36a and 36b, is introduced via the input port 37a and the output port 37b into the oil line b so that it is supplied to the fourth clutch hydraulic servo $C_0$ and the accumulator chamber $9_3$ of the accumulator $2_3$.

Moreover, the 2-3 shift valve 37 has the communication of its port 37i switched from the D range line pressure supply port 37f to the drain port 37c so that the oil pressure to the first input port 32d of the $B_1$ modulator control valve 32 is drained.

Moreover, the oil pressure supplied to the hydraulic servo $C_0$ is exerted via the oil line c upon the constraining control oil chamber 80b of the C3 timing valve 80 to switch this valve 80 to the righthand half position. As a result, the line pressure from the line pressure port 39d of the 3-4 shift valve 39 is supplied via the port 39i to the input port of the C3 timing valve 80 and further via the output port and the modulator valve 68 to the third clutch hydraulic servo $C_3$.

When the oil pressure of the fourth clutch hydraulic servo $C_0$ and its accumulator $2_3$ rises to a predetermined level, it is applied to the first control oil chamber 33d of the 2-3 timing valve 33 so that this valve 33 is switched to its upper half position. As a result, the oil pressure from the oil line b is quickly applied to the oil line d via the line pressure supply port 33a and the output port 33b and further to the brake releasing oil pressure chamber 35 of the first brake hydraulic servo $B_1$ via the ports 39a and 39b.

In this state, moreover, the oil pressure of the hydraulic servo $C_0$ is exerted via the oil line c upon the control chamber 32c of the $B_1$ modulator control valve 32 to switch this valve 32 to its lefthand half position. However, the 3-4 shift valve 39 has its port 39c communicating with the drain port 39e, and the $B_1$ modulator control valve 32 has its second input port 32a as well as its first input port 32d drained. As a result, the $B_1$ modulator valve 30 is in its pressure modulating state so that its line pressure supply port 30b has its line pressure reduced at a predetermined ratio by the feedback pressure of the feedback port 30d. Thus, said modulator pressure is exerted through the oil line f upon the brake engaging oil pressure chamber 31 of the first brake hydraulic servo $B_1$.

As a result, in this hydraulic servo $B_1$, the line pressure acting upon the brake releasing oil pressure chamber 35 overcomes the modulator pressure acting upon the brake engaging oil pressure chamber 31 to release the band brake B1. At this time, the oil pressure of the hydraulic servo $C_0$ communicating with the accumulator $2_3$ is boosted to switch the 2-3 timing valve 33. As a result, the oil pressure is prevented from being quickly supplied to the brake releasing oil pressure chamber 35. Thus, the first brake B1 is prevented from being released prior to the engagement of the fourth clutch C0, and accordingly return for even an instant to the first speed is prevented.

At the shift from the 2nd to 3rd speed, moreover, the throttle pressure control valve 5 is also properly controlled by the electric signal, and the line pressure is controlled according to said throttle pressure by the accumulator control valve 20. This controlled pressure is supplied to the back pressure chambers $7_1$ to $7_4$ of the accumulators $2_1$ to $2_4$ and to the second control chamber 33d of the 2-3 timing valve 33.

As a result, the accumulator back pressure control is performed like before on the basis of the throttle pressure control valve 5, and the oil pressure of the hydraulic servo $C_0$ is controlled to match the engagement characteristics of the clutch C0 so that said clutch C0 is smoothly engaged. At the same time, the switching timing of the timing valve 33 is properly adjusted to time the engagement of the fourth clutch C0 and the release of the first brake B1.

Simultaneously with this, the control oil chamber 30e of the $B_1$ modulator valve 30 is also supplied with the oil pressure from the output port 20b of the accumulator control valve so that its modulator pressure is properly modulated to a higher level. The oil pressure thus modulated is supplied via the oil line f to the brake engaging oil pressure chamber 31 to time the release of said brake B1 properly in accordance with the control of the aforementioned timing valve 33.

In the 3rd speed state, on the other hand, in which the third clutch C3 and the fourth clutch C0 as well as the first clutch C1 are engaged, whereas the first brake B1 is released, the rotation of the input shaft 15 is transmitted through the one-way clutch F0 and the third clutch C3 to the smaller ring R1 and further through the fourth clutch C0 to the larger ring gear R2 so that the integral rotation of the planetary gear unit 12 are extracted from the carrier output gear 13.

At this time, the engagement change between the fourth clutch C0 and the first brake B1 occurs. However, no shift shock will take place because the proper timing is achieved, as described above, and because the shifts via other gear stages are blocked. Simultaneously with this, moreover, the third clutch C3 is also engaged, and this engagement timing may be slow because said clutch C3 is in parallel with the second one-way clutch F0.

Next, in the 4th speed state, the first solenoid valve $S_L1$ is OFF, and the second solenoid valve $S_L$ is switched OFF. In this state, the 2-3 shift valve 37 is held in its upper half position, and the 3-4 shift valve 39 is switched to its upper half position by having its control chamber 39f fed with the control oil pressure. On the other hand, the 1-2 shift valve 36 has its control oil chamber 36d fed with the control oil pressure but its constraining control oil chamber 36g is fed with the line pressure of the line pressure supply port 37f of the 2-3 shift valve 37 via the port 37h, so that the 1-2 shift valve 36 is held in its lower half position. As a result, the 3-4 shift valve 39 has its $B_1$ relief port 39b communicating with the drain port 39e so that the brake engaging oil pressure chamber 31 of the first brake hydraulic servo $B_1$ is drained.

At the aforementioned 3rd speed, since the oil pressure is supplied to the fourth clutch hydraulic servo $C_0$, the oil pressure is supplied via the oil line c to the control oil chamber 32c of the $B_1$ modulator control valve 32 so that this valve 32 is switched to its lower half position in which the second input port 32a and the output port 32b are communicating with each other. If, in this state, the 3-4 shift valve 39 is switched at the 4th speed to have its line pressure supply port 39d communicating with the port 39c, the line pressure is fed via the ports 39d and 39c and the ports 32a and 32b of the $B_1$ modulator control valve to the constraining control oil chamber 30c of the $B_1$ modulator valve 30 so that this modulator valve 30 is switched to the line pressure supply state in which the line pressure port 30b and the pressure modulation port 30a are communicating with each other.

As a result, the line pressure coming from the line pressure is introduced as is to the oil line f via the ports 30b and 30a so that the oil pressure supplied to the brake engaging oil pressure chamber 31 of the first brake hydraulic servo $B_1$ is switched from the modulator pressure to the line pressure. At this time, like before, the shift can be smoothed by controlling the oil pressure to be supplied to the back pressure chamber $7_4$ of the accumulator $2_4$ on the basis of the electric control of the throttle pressure control valve 5. Despite this fact, however, the engagement of the first brake B1 is controlled by adjusting the drain oil pressure from the brake releasing oil pressure chamber 35 by means of orifices 83a, 83b, 83c and so on.

Since the 3-4 shift valve 39 has its C3 timing port 39i communicating with the drain port 39j, the oil pressure of the third hydraulic servo $C_3$ is drained through a check valve 85 and the C3 timing valve 80 and via the ports 39i and 39j of the 3-4 shift valve 39.

Incidentally, in the 4th speed state, the throttle pressure control valve 5 is controlled to a rather high level by the electric signal coming from the control unit, and the accumulator back pressure or the output pressure of the accumulator control valve 20 is also set to a rather high level.

In the 4th speed state, the first clutch C1 and the fourth clutch C0 are in their engaged states, and the first brake B1 is switched to its engaged state whereas the third clutch C3 is switched to its released state. In this 4th speed state, the rotation of the input shaft 15 is transmitted through the fourth clutch C0 to the larger ring gear R2. At the same time, the sun gear S is stopped by the first brake B1 so that the rotation of said larger ring gear R2 rotates the carrier CR at a high speed while rotating the ring gear R1 idly. The rotation of the carrier CR is transmitted to the output gear 13.

At this time, the first brake B1 is engaged, and the third clutch C3 is released. Even if, however, the third clutch C3 is prematurely released, the 3rd speed state is maintained by the second one-way clutch F0. As a result, the shift shocks, which might otherwise be caused by the engagement change, can be prevented by delaying the engagement of the first brake B1 by means of the orifices 83a to 83c.

At downshift from the 4th to 3rd speeds, on the other hand, the 3-4 shift valve 39 is switched to its lower half position, as has been described hereinbefore, the oil pressure of the oil line b is supplied via the ports 39a and 39b to the brake releasing oil pressure chamber 35 of the first brake hydraulic servo $B_1$, and the line pressure of the line pressure supply port 39d is supplied via the port 39i and thorough the C3 timing valve 80 and the $C_3$ modulator valve 68 to the third clutch hydraulic servo $C_3$.

At this time, the release oil pressure to be supplied to the brake releasing oil pressure chamber 35 of the hydraulic servo $B_1$ is controlled by means of the orifices 83b and 83c, and the second one-way clutch F0 is switched from overrun to engagement, so that the shift can be smoothly effected.

At the downshift from the 3rd to 2nd speed, moreover, the 2-3 shift valve 37 is switched to its lower half position, as has been described hereinbefore, to have its $C_0$ port 37b and drain port 37c communicating with each other. Then, the oil pressure in the brake releasing oil pressure chamber 35 of the hydraulic servo $B_1$ is drained at first from the drain port 37c via the ports 39b and 39a, the oil line d, the oil line e, the oil line b and the port 37b, and the oil pressure of the third clutch hydraulic servo $C_0$ is drained together with the oil pressure of the accumulator chamber $9_3$ of the accumulator $2_3$ from the drain port 37c via the oil line b and the port 37b.

As a result, the release of the fourth clutch C0 is delayed relative to the engagement of the first brake B1 thereby to prevent the shifting operations from the 3rd through 1st to 2nd speeds, namely, the shift which will pass the 1st speed state with both the fourth clutch C0 and the first brake B1 released. Incidentally, at the downshift from the 3rd to 2nd speeds, the C3 timing valve 80 is switched to its lefthand half position by having its constraining control oil chamber 80b relieved from the oil pressure based upon the hydraulic servo $C_0$, so that the oil pressure of the hydraulic servo $C_3$ is drained via the check value 85 from the drain port of the C3 timings valve 80. At the downshift from the 2nd to 1st speeds, moreover, the 1-2 shift valve 36 is switched to its upper half position to have its output port 36b communicating with its drain port 36c. As a result, the oil pressure of the brake engaging oil pressure chamber 31 of the first brake hydraulic servo $B_1$ is discharged to the drain port 36c from the oil line f, the ports 30a and 30b of the $B_1$ modulator valve 30, the check value 99, the oil line a and the port 36b.

At the kickdown from the 4th to 2nd speeds, on the other hand, the 3-4 shift valve 39 is switched to its lower half position, and the 2-3 shift valve 37 is also switched to its lower half position. As a result, the oil pressure of the fourth clutch hydraulic servo $C_0$ is discharged from the drain port 37c via the oil line b and the port 37b, and the oil pressure of the brake releasing oil pressure chamber 35 of the first brake hydraulic servo $B_1$ is also discharged from the drain port 37c via the ports 39a and 39b, the oil line d, the check value 41, the oil lines e and a and the port 37b.

At this time, the $B_1$ modulator control valve 32 is switched to its righthand half position by having its control oil chamber 32c relieved from its oil pressure based upon the hydraulic servo $C_0$. At the same time, the $B_1$ modulator control valve 32 has its input port 32a drained to relieve the constraining pressure of the constraining control oil chamber 30c of the $B_1$ modulator valve 30 so that this valve 30 generates the modulator valve pressure. However, the $B_1$ modulator valve 30 is held in its line pressure supplied state because the line pressure is instantly supplied to the port 32d of the control valve 32 via the port 37i of the 2-3 shift valve 37 and further to the constraining control oil chamber 30c via the port 32b.

As a result, the first brake B1 is maintained in its engaged state without passing through any release so that the downshift is quickly and smoothly effected by the single operation. If, on the other hand, the manual valve 62 is shifted to the R range, the line pressure is supplied from the R range port to the second clutch hydraulic servo $C_2$ and its accumulator $2_2$. At this time, like before, the throttle pressure control valve 5 is properly controlled to the proper level by the electric signal coming from the control unit, and the oil pressure having acted upon the accumulator control valve 20 and dropped from the line pressure is supplied to the back pressure chambers $7_1$ to $7_4$ of the accumulators $2_1$ to $2_4$ to control the back pressure of the accumulator $2_2$. As a result, the oil pressure of the hydraulic servo $C_2$ is controlled to correspond to the engagement characteristics of the second clutch C2 so that the shifts from the N to R ranges or from the D to R ranges can be smoothed. In this reverse (R) range, that is, in case the vehicle is running at a predetermined low speed, e.g., 7 Km/H or substantially in the halted state, the 1-2 shift valve 36 is in its upper half position, and the line pressure from the R range port is supplied to the second brake hydraulic servo $B_2$ through the two-way check valve and via the ports 36f and 36e. In the reverse state, moreover, in which the second clutch C2 and the second brake B2 are engaged, the rotation of the input shaft 15 is transmitted through the second clutch C2 to the sun gear S. Since, moreover, the larger ring gear R2 is stopped by the second brake B2, the rotation of said sun gear S is reversed and transmitted to the carrier CR, while reversing the smaller ring gear R1 idly, so that these reverse rotations are extracted from the output gear 13.

In the reverse range, moreover, in case the vehicle is coasting at a predetermined speed or more, the second solenoid valve $S_L2$ is turned ON to switch the 1-2 shift valve 36 to its lower half position. In state, no oil pressure is supplied to the second brake hydraulic servo $B_2$ so that the aforementioned reverse state is not effected.

If the manual valve 62 is shifted to the 2nd range, on the other hand, the line pressure of the 2nd range port is supplied to the constraining control oil chamber 39h of the 3-4 shift valve 39 so that this valve 39 is blocked from coming into its upper half position, i.e., the 4th speed position.

Moreover, the line pressure of the 2nd range port is supplied to the constraining control oil chamber 80b of the C3 timing valve 80 to hold this valve 80 in its righthand half position so that the third clutch hydraulic servo $C_3$ is always supplied with the oil pressure at the 1st, 2nd and 3rd speeds.

As a result, the input shaft 15 and the smaller ring gear R1 are connected through the third clutch C3 so that braking by the engine is achieved by eliminating the coasting of the vehicle, which might otherwise be caused by the overrun of the second one-way clutch FO.

If, moveover, the manual valve 62 is shifted to the 1st range, the line pressure of the 1st range port is supplied to the constraining control oil chamber 37e of the 2-3 shift valve 37 so that this valve 37 is blocked from coming into its upper half position, i.e., the 3rd and 4th speed positions. The line pressure of the 1st range port is reduced by a low pressure modulator valve 79. This modulated pressure is supplied through the two-way check valve to the port 36f of the 1-2 shift valve 36 and further to the second brake hydraulic servo B2 at the 1st speed. Incidentally, the embodiment thus far described uses the $B_1$ modulator control valve 32, which is not always indispensable.

Figure 1:
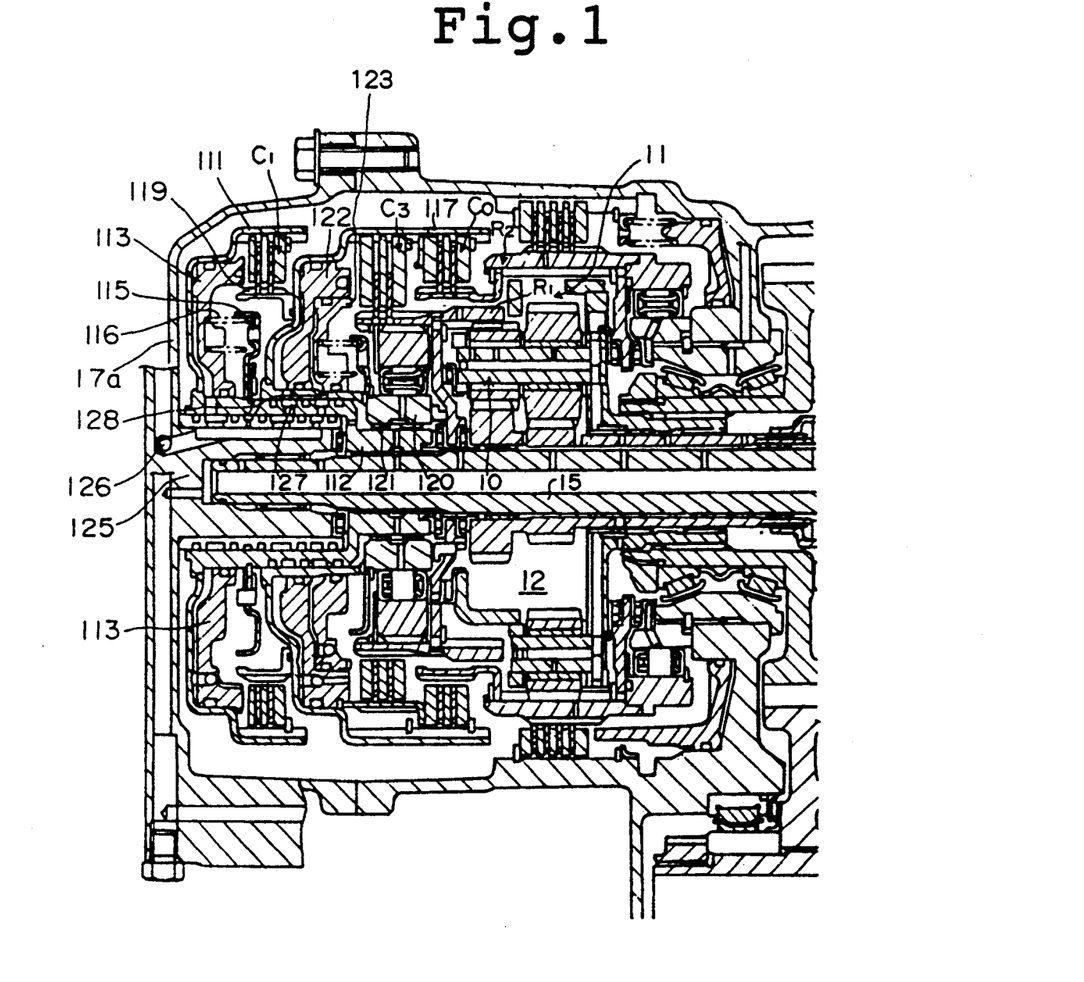
FIG. 1 is a section showing a clutch system of the present invention.

As shown in FIG. 1, drum 111 of the clutch C1 has its rotatably supporting portion 112 splined on its inner face to the input shaft 15. Moreover, a piston member 113 is fitted in the drum 111 of the clutch C1, and a spring 116 is interposed between the piston member 113, and a stop ring 115 at the back of the piston member 113, thus forming the hydraulic servo for the clutch C1. On the other hand, the clutch C1 is interposed between the inner circumference of the outer flange portion of the drum 111 of the clutch C1 and a hub portion 119 which is projected toward the C1 drum 111 from the radial flange portion of a clutch CO drum 117. The rotatably supporting portion 120 of the clutch CO drum 117 is supported for relative rotation on the outer circumference of the rotatably supporting portion 112 of the drum 111 of the clutch C1 by a bearing 121.

In the drum 117 of the clutch CO, there are fitted two piston members, the larger one 122 of which receives a smaller one 123 in its recess. The larger piston 122 constitutes the hydraulic servo for engaging or releasing the clutch CO, whereas the smaller piston 123 constitutes the hydraulic servo for engaging or releasing the clutch C3. In other words, the clutches C3 and CO are interposed between the inner circumference of the outer side of the clutch CO drum 117 and the ring gears R1 and R2 of the single planetary gear 10 and the dual planetary gear 11. On the other hand, the clutch C1 is connected to the ring gear R1 of the single planetary gear 10 through the CO drum 117 and the one-way clutch FO.

The oil pressure for actuating the clutches C0 and C3 is supplied through section 125 of a transmission casing 17a. This section 125 has its oil passage 126 extended through the inner face of the rotatably supporting portion 112 of the clutch C1 drum 111 and further through an oil passage 127 formed in the outer surface of said rotatably supporting portion 112. Oil pressure is applied to the backs of the larger piston 122 and the smaller piston 123 through an oil passage 128 formed in the outer surface of the rotatably supporting portion 120 of the C0 drum 117.

Thus, the inner circumference of the drum rotatably supporting portion of the clutch C0 acting as the O/D mechanism is arranged over the inner circumference of the drum rotatably supporting portion 112 of the clutch C1 so that the axial size of the clutch C0 drum 117 can be reduced. Since, moreover, the clutch C0 can be engage with the ring gear R2 of the dual planetary gear 11 within the radial dimension of the clutch C1, the radial size can also be reduced.

Since, furthermore, the clutch C1 drum 111 is adjacent to the transmission casings 17a, the C1 clutch drum 111 rotating at all times can be easily used as the output to the input shaft r.p.m. sensor.

We claim:

1. An automatic transmission comprising:
   a planetary gear unit having a plurality of rotary components and a reaction member;
   an input shaft connected to at least a first of said rotary components;
   an output shaft connected to a second of said rotary components;
   a brake for selectively braking said reaction member;
   a first clutch system comprising:
   a first drum;
   a first hub member fixed to said first drum slidably mounted on and rotating with said input shaft;
   a first clutch mounted within said first drum;
   a first piston slidably mounted in said first drum for selectively engaging said first clutch; and
   a second clutch system comprising:
   a second drum;
   a second hub member fixed to said second drum and rotatably mounted on said first hub member;
   a radially extending portion connecting said second drum with said second hub;
   an axial extension fixed to said radially extending portion, said first clutch selectively connecting said axial extension with said first drum;
   a second clutch for selectively connecting said second drum with one of said rotary components; and
   a second piston slidably mounted in said second drum for selectively engaging said second clutch.

2. An automatic transmission in accordance with claim 1 wherein said transmission includes a casing having an axial extension receiving one end of said input shaft, said axial extension rotatably supporting a portion of said first hub member with a second portion of said hub member being splined to said input shaft.

3. An automatic transmission in accordance with claim 1 wherein said automatic transmission has a casing including an axially extending portion and a radially extending portion covering one end of said axially extending portion, said first drum being located axially between said radially extending portion of said casing and said second drum.

* * * * *

UNITED STATES PATENT AND TRADEMARK OFFICE
CERTIFICATE OF CORRECTION

PATENT NO. : 5,203,862
DATED     : April 20, 1993
INVENTOR(S) : NISHIDA et al

It is certified that error appears in the above-identified patent and that said Letters Patent is hereby corrected as shown below:

Col. 1, line 11, after "speaking" insert --an--.

Col. 4, line 56, before "65" insert --Numeral--.

Col. 5, line 12, before "not" insert --are--.

Col. 11, line 59, "value" should read --valve--.

Col. 12, line 1, "value" should read --valve--.

Signed and Sealed this

Twenty-second Day of February, 1994

Attest:

BRUCE LEHMAN

Attesting Officer    Commissioner of Patents and Trademarks